United States Patent
Horikawa

(10) Patent No.: US 6,708,030 B1
(45) Date of Patent: Mar. 16, 2004

(54) SELECTION METHOD OF A HANDOFF SYSTEM IN A CDMA MOBILE COMMUNICATION SYSTEM

(75) Inventor: Kiyotaka Horikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/369,021

(22) Filed: Aug. 6, 1999

(30) Foreign Application Priority Data

Aug. 14, 1998 (JP) .......................................... 10-229807

(51) Int. Cl.[7] ................................................ H04Q 7/20
(52) U.S. Cl. ........................ 455/436; 455/438; 455/439; 455/442; 370/331; 370/332; 370/335
(58) Field of Search ................................ 455/442, 436, 455/444, 438, 509, 439; 370/331, 332, 204, 320, 334, 333, 335, 328

(56) References Cited

U.S. PATENT DOCUMENTS

| | | | |
|---|---|---|---|
| 4,654,867 A | | 3/1987 | Labedz et al. |
| 5,793,762 A | | 8/1998 | Penners et al. |
| 6,021,123 A | * | 2/2000 | Mimura ....................... 370/331 |
| 6,167,035 A | * | 12/2000 | Veeravalli et al. .......... 370/331 |
| 6,208,862 B1 | * | 3/2001 | Lee ............................ 455/442 |

FOREIGN PATENT DOCUMENTS

| | | |
|---|---|---|
| EP | 0 817 517 A1 | 1/1998 |
| EP | 0 920 230 A1 | 6/1999 |
| JP | 9-214516 | 8/1997 |
| JP | 9-231149 | 9/1997 |
| JP | 9-312869 | 12/1997 |
| JP | 10-4580 | 1/1998 |
| JP | 10-13907 | 1/1998 |

* cited by examiner

Primary Examiner—Cong Van Tran
(74) Attorney, Agent, or Firm—Sughrue Mion, PLLC

(57) ABSTRACT

A selection method of a handoff system in a CDMA radio data communication system, which is capable of selecting one of a hard handoff system and a soft handoff system depending on situations of a call, is provided. The mobile station informs presence or absence of own agent for application to be used in the communication to a radio base station control equipment when sending a call connection request signal. The radio base station control equipment recognizes the kind of the agent in the mobile station and confirms if a corresponding agent is provided in an agent server. The mobile station determines a handoff system depending on a condition that the agent can be used in the communication or not. The hard handoff system is selected when the agent can be used, and the soft handoff is selected when the agent cannot be used.

6 Claims, 11 Drawing Sheets

SELECTION METHOD OF A HANDOFF SYSTEM IN A CDMA MOBILE COMMUNICATION SYSTEM

BACKGROUND OF THE INVENTION

1. Field of the Invention

The present invention relates to a CDMA (Code Division Multiple Access) radio data communication system, particularly to a selection method of a handoff system between a soft handoff system and a hard handoff system.

2. Description of the Related Art

As is well known, as multiple access (MA) systems, there are known a time division multiple access (TDMA) system, a frequency division multiple access (FDMA) system and a code division multiple access (CDMA) system. Among the MA systems, the CDMA system is adopted in a mobile communication system in view of the fact that it is strong at noise and excellent in concealing performance. Further, in the mobile communication system of the CDMA system, when a mobile station is moved from one cell (a radio zone covered by a radio base station, sometimes called as a service area) to other cell, communication can be carried out with the both radio base stations covering the cells. Because the same frequency for radio communications in any cell is utilized in the CDMA system, and even when the mobile station moves between the cells, a reception frequency or a transmission frequency needs not to change. This is referred to as soft handoff or soft hand over in this technical field.

In contract thereto, according to the TDMA system or the FDMA system, only so-to-speak hard handoff (hard hand over) can be carried out. An interruption of communication occurs in the hard handoff when a communication channel is switched from one radio base station to another radio base station. Incidentally, caution is required to the fact that the CDMA system is not only able to carry out only soft handoff but also able to carry out both of soft handoff and hard handoff.

As described above, according to the mobile communication system of the CDMA system, even when the mobile station moves between the cells, the mobile station can always communicate with at least one radio base station with no momentary interruption. Therefrom, the mobile communication system of the CDMA system is provided with an advantage in which not only voice communication but also data communication can be carried out. In this specification, a mobile radio system of a CDMA system capable of dealing with also data communication is referred to as "CDMA radio data communication system".

Conventionally, the CDMA radio data communication system of this kind includes a radio base station control equipment (BSC) connected to a mobile switching center (MSC), a plurality of radio base stations (BTS) connected to the radio base station control equipment and a mobile station (MS) for carrying out data communication with the radio base stations while moving cells covered by the radio base stations. Further, the radio base station control equipment is also referred to as a base station control equipment or a radio control base station.

An explanation will be given of operation of a CDMA system in a hard handoff control in reference to FIG. 10. Here, an explanation will be given of the operation when a mobile station is switched from a state of carrying out data communication with an radio base station (hereinafter, referred to as "old radio base station") to data communication with other radio base station (hereinafter, referred to as "new radio base station").

First, the mobile station carries out data communication with the old radio base station and the old radio base station carries out data communication with the base station control equipment. Assume that under the state, by movement of the mobile station to a vicinity of a boundary of a cell covered by the old radio base station, a reception electric field intensity of a pilot signal transmitted from the old radio base station at the mobile station is relatively weakened and by approach of the mobile station to a boundary of a cell covered by the new radio base station, a reception electric field intensity of a pilot signal transmitted from the new radio base station at the mobile station is relatively strengthened. In this case, the mobile station transmits a hard handoff request signal to the old radio base station. The old radio base station transmits the received hard handoff request signal to the base station control equipment.

In response to the hard handoff request signal, the base station control equipment carries out a channel assignment to the new radio base station. When the channel assignment can be confirmed, the new radio base station transmits a channel assignment confirmation signal to the base station control equipment. In response to the channel assignment confirmation signal, the base station control equipment transmits a handoff message to the mobile station via the old radio base station.

In response to the handoff message, the mobile station returns a handoff message response signal to the base station control equipment via the old radio base station. Thereafter, the mobile station transmits a preamble signal to the new radio base station. In response to the preamble signal, the new radio base station transmits establishment of synchronization to the base station control equipment. In response to the establishment of synchronization, the base station control equipment transmits a base station confirmation request signal to the mobile station via the new radio base station. In response to the base station confirmation request signal, the mobile station returns a base station confirmation response signal to the new radio base station.

Thereafter, the base station control equipment notifies channel release to the old radio base station. Further, the mobile station carries out data communication with the new radio base station and the new radio base station carries out data communication with the base station control equipment.

Next, an explanation will be given of operation of a CDMA system in a soft handoff control in reference to FIG. 11. Also in this case, an explanation will given of the operation when the mobile station is switched from a state of carrying out data communication with the old radio base station to data communication with the new radio base station.

First, the mobile station carries out data communication with the old radio base station and the old radio base station carries out data communication with the base station control equipment. Assume that under the state, by movement of the mobile station to a vicinity of a boundary of a cell covered by the old radio base station, a reception electric field intensity of a pilot signal transmitted from the old radio base station at the mobile station is relatively weakened and by approach of the mobile station to a boundary of a cell covered by the new radio base station, the reception electric field intensity of a pilot signal transmitted from the new radio base station at the mobile station is relatively strengthened. In this case, the mobile station transmits a first soft handoff request signal to the old radio base station. The old radio base station transmits the received first soft handoff request signal to the base station control equipment. The first soft handoff request signal is a request signal for assigning other channel since radio wave of a channel which has been used in the communication becomes weak.

In response to the first soft handoff request signal, the base station control equipment carries out channel assignment to the new radio base station. When the channel assignment can be confirmed, the new radio base station transmits a channel assignment confirmation signal to the base station control equipment. In response to the channel assignment confirmation signal, the base station control equipment transmits a handoff message to the mobile station via the old radio base station.

In response to the handoff message, the mobile station returns a handoff message response signal to the base station control equipment via the old radio base station. Thereby, "soft handoff state", surrounded by a quadrangle of dotted lines in FIG. 11, is brought about. The mobile station carries out data communication with both of the old radio base station and the new radio base station and the old radio base station and the new radio base station carry out data communication with base station control equipment. In other words, the soft handoff state is a state in which communication is carried out by two channels.

Assume that thereafter, a reception electric field intensity of a pilot signal transmitted from the old radio base station at the mobile station is weakened to a degree by which data communication between the mobile station and the old radio base station becomes difficult. In this case, the mobile station transmits a second soft handoff request signal to the base station control equipment via both of the old radio base station and the new radio base station. The second soft handoff request signal is a request signal for releasing one channel since radio wave of a channel reaches a necessary level. In response to the second soft handoff request signal, the base station control equipment transmits a handoff message to the mobile station via both of the old radio base station and the new radio base station.

In response to the handoff message, the mobile station returns a handoff message response signal to both of the old radio base station and the new radio base station. At this time point, the mobile station is disposed on or outside of the boundary of the cell covered by the old radio base station and the old radio base station cannot receive a handoff message response signal. In contrast thereto, the mobile station enters within the boundary of the cell covered by the new radio base station and accordingly, the new radio base station can receive the handoff message response signal and the new radio base station transmits the received handoff message response signal to the base station control equipment.

In response to the handoff message response signal from the new radio base station, the base station control equipment notifies channel release to the old radio base station. In response to the notification of channel release, the old radio base station returns a channel release response signal to the base station control equipment. Further, the mobile station carries out data communication with the new radio base station and the new radio base station carries out data communication with the base station control equipment.

An explanation will be given of data communication (a selection method of the handoff operation) of a conventional CDMA radio data communication system described above in reference to FIG. 12.

When data communication is carried out in the conventional CDMA radio data communication system, the mobile station firstly makes a call connection request to a radio base station control equipment (radio control base station) via a radio base station (step E1). Successively, the mobile station notifies a handoff system (soft handoff) to be carried out to the radio control base station (step E2).

That is, according to the conventional CDMA radio data communication system, normally, data communication is carried out by using the soft handoff as shown in FIG. 11 as the handoff system. The hard handoff system as shown in FIG. 10 is used in a special case in which the radio base station is failed or the like.

In the meantime, there has been proposed a radio data communication system carrying out communication by using an agent which is not a CDMA radio data communication system. In this case, "agent" is referred to a concept which has been proposed as a man/machine interface of next generation in which all of operation necessary for executing a specific instruction is self-controllably executed on the side of a machine with no intermediary of manual operation. In other words, "agent" is referred to a software module capable of spontaneously determining and carrying out what is to be processed.

Further, an agent used in a mobile communication system is referred to as "mobile agent". That is, the "mobile agent" is an agent for resolving a problem particular to a mobile communication environment. Further, almost all of agents used in the invention correspond to, (or are used by) communication application for eliminating wasteful communication such as data retransmission or the like by call disconnection caused in communication. Caution is required here that in each application, there is existed one agent in correspondence therewith (or used thereby).

For example, JP-A-9-231149 (hereinafter, referred to as prior art 1) has proposed a "radio data communication system" resolving a problem in which the transmission efficiency is significantly deteriorated by retransmission or the like when channel quality is poor by a deterioration in a radio channel state or the like in the case of communication with no intermediary of an agent. According to the radio data communication system described in prior art 1, a first computer connected operationally to a first radio device and a second computer connected operationally to a second radio device communicate data via a radio channel. The respective computers are provided with interfaces of the radio devices to the computers between the first computer and the first radio device and between the second computer and the second radio device, the radio devices are provided with interface functions of the computers to the radio devices and there are arranged a first and a second agent operable self-controllably in accordance with a given situation.

Further, JP-A-9-214516 (hereinafter, referred to as prior art 2) is described with a "mobile terminal" capable of moving in a sub network where a current agent is not present so far as a home agent is present. The mobile terminal described in prior art 2 is provided with a location registering function, a location controlling function and a packet conversion function. According to the location registering function, the terminal is moved and connected to a different sub network and information of self location is informed to a home agent to thereby carry out a registering procedure and is periodically informed to a connected sub network. Further, the location controlling function controls the location information informed from a mobile terminal connected to the same sub network. Further, the packet conversion function detects whether a transmitted party is a mobile terminal or a fixed terminal and converts a packet in a pertinent style. The mobile terminal can move to a sub network where an agent is not present by controlling information necessary for movement of its own.

Further, there have been known various prior arts in respect of a mobile communication system of a CDMA system using soft hand over (soft handoff).

For example, according to JP-A-9-312869 (referred to as prior art 3), there is disclosed "a method and a base station device as well as a mobile station device for executing "soft hand over start/finish processing" capable of optimizing a radio section capacity in both channels of a reverse channel and a forward channel. That is, according to prior art 3, when soft hand over for switching communication for a while from a first base station currently communicating to a second base station is carried out in accordance with movement of the mobile station, a trigger of start/finish of soft hand over in respect of a reverse communication channel from a mobile station to the base station and a trigger of start/finish of soft hand over in respect of a forward communication channel from the base station to the mobile station, are constituted by triggers which are set independently from each other.

Further, according to JP-A-10-13907 (hereinafter, referred to as prior art 4) there is disclosed "a method of determining a kind of hand over in a CDMA mobile communication system and the CDMA mobile communication system" capable of determining a kind of an optimum hand over from a plurality of kinds of hand over. That is, according to prior art 4, the mobile station determines a start condition of a kind having the most moderate start condition in hand over of a plurality of kinds and when the determination is satisfied, the mobile station informs this to a base station. Further, the mobile station determines a start condition of hand over of a kind having the most moderate start condition other than hand over of specific kinds which cannot be executed and when the determination is satisfied, the mobile station informs this to the base station.

Further, according to JP-A-10-4580 (hereinafter, referred to as prior art 5) although not a mobile communication system of a CDMA system, there is disclosed "a handoff communication system" capable of providing voice quality to a degree of that of conventional soft handoff even hard handoff having a simple system constitution is adopted. That is, according to prior art 5, a base station is installed with voiceless section detecting means for detecting a voiceless section of the communication, voiceless code data generating means for generating voiceless code data by detecting the voiceless section and transmitting data selecting means for selecting the voiceless code data in place of voice data at a front section of the voiceless section and supplying it to a transmitter. In the meantime, a mobile station is installed with handoff condition alleviating means for alleviating a handoff condition by lowering a threshold value of power of a reception signal necessary for switching the base station based on the voiceless code data transmitted from the base station.

However, according to the conventional CDMA radio data communication systems mentioned above, there poses the following problem. That is, the mobile station designates a soft handoff system as the handoff system so far as there is no abnormality of obstacle or the like in surrounding channels when a call connection is requested. Therefore, a plurality of channels are used in the handoff operation. Accordingly, a number of mobile stations capable of using a channel is limited.

Further, the above-described prior arts 1 through 5 only disclose technical thoughts which are quite different from that of an object of the present invention as respectively explained below although the prior arts more or less relate to the mobile communication system.

That is, prior art 1 only discloses technical thought with regard to the radio data communication system via agents and as not disclosed anything in respect of handoff control (selection) particular to the CDMA radio data communication system. Further, prior art 2 only discloses technical thought with regard to the mobile terminal capable of moving also to a sub network where the current agent is not present and does not disclose anything in respect of handoff control (selection) particular to the CDMA radio data communication system similar to the above-described prior art 1.

Also, either of prior arts 3 and 4 does not disclose anything in respect of handoff control (selection) in carrying out communication by using agents although the prior arts disclose technical thoughts with regard to a mobile communication system of a CDMA system. That is, prior art 3 only discloses technical thought in which triggers of start/finish of soft hand over are set to a reverse communication channel and a forward communication channel independently from each other. Further, prior art 4 only discloses technical thought in which an optimum hand over kind is determined from a plurality of kinds of hand over regardless of presence or absence of agents.

Further, prior art 5 only discloses the handoff communication system in which hard handoff having a simple system constitution is adopted and does not disclose anything in respect of handoff control (selection).

It is an object of the present invention to provide a CDMA radio data communication system in which handoff control with regard to a communication capable of continuing the communication by a function of a (mobile) agent even when the communication is interrupted in the midway, is constituted by hard handoff control.

SUMMARY OF THE INVENTION

The present invention adopts the following technical constitution in order to achieve the above-described object. That is, according to the present invention, a selection method of a handoff system in a CDMA radio data communication system characterized in a selection method of either of a hard handoff system and a soft handoff system as the handoff system, the method comprises: selecting the hard handoff system when the data communication is performed by using an agent function; and selecting the soft handoff system when an agent function is not available for the data communication.

More specifically, the method comprises: transmitting a call connection request signal, by a mobile station, including information of presence of the client side agent and a kind of the client side agent in correspondence with the application to be used in the communication, to the radio base station control equipment; searching presence of the server side agent corresponding to the client side agent in a agent server which is connected to the radio base station control equipment; selecting the hard handoff system when the server side agent corresponding to the client side agent is provided in a agent server; and selecting the soft handoff system when the server side agent corresponding to the client side agent is not provided in a agent server.

Further, a selection method of a handoff system in a CDMA radio data communication system characterized in a selection method of either of a hard handoff system and a soft handoff system as the handoff system, comprises: transmitting a call connection request signal, by a mobile station, including information of presence of the client side agent and a kind of the client side agent in correspondence with the application to be used in the communication, to the radio base station control equipment; searching presence of the server side agent corresponding to the client side agent in a agent server which is connected to the radio base station control equipment; returning the searching result of the server side agent; and determining the handoff system based on an availability of the server side agent in the agent server obtained by the searching result.

The hard handoff system is determined for selection of the handoff system to be performed when the server side agent is available, and the soft handoff is determined for selection of the handoff system to be performed when the server side agent is not available.

Also, selection of the handoff system may be determined by the mobile station, and informing the determining result to the radio base station control equipment.

On the other hand, selection of the handoff system may be determined by the radio base station control equipment, and informing the determining result to the mobile station.

Further more, according to the present invention, a selection method of a handoff system in a CDMA radio data communication system in which an agent server, connected to a radio base station control equipment and incorporating server side agents in correspondence with various applications, and a mobile station, incorporating a client side agent and carrying out a communication with radio base stations while moving in service areas by performing either of a hard handoff system and a soft handoff system, the method comprises: confirming an availability of the client side agent for an application to be used in the mobile station; transmitting a signal including information of the client side agent from the mobile station to the radio base station control equipment; confirming an availability of the server side agent, which is corresponding to the client side agent informed by the mobile station, in the agent server; informing the result of confirmation in the agent server to the mobile station; and determining the handoff system to be performed based on an availability of the server side agent in the agent server informed by the result of confirmation in the agent server.

In generating a call (or transmitting data) in data communication, the mobile station detects presence or absence of an agent function previously and informs the radio base station control equipment with presence or absence of an agent and a kind of an agent for application used along with the call connection request (or agent request). The radio base station control equipment detects whether there is an agent for application in correspondence with the agent server and informs the mobile station with a result of the detection. Thereby, the mobile station informs the radio base station control equipment that communication is carried out by the hard handoff system when the agent can be used and inform the radio base station control equipment that communication is carried out by the soft handoff system when the agent cannot be used.

In this way, according to the present invention, the hard handoff system is used as the handoff system in the case of data communication in which communication can be continued by the agent even if the call is interrupted and accordingly, the circuit can effectively be utilized. Because when the call is interrupted in the midway, the server (base station side) and the client (mobile station side) share information of transmitting data from where to where by how much and accordingly, successive data can be transmitted by reconnection from the mobile station.

Further, in the case in which communication is difficult to continue as in the case in which communication must be made again from the start when the call is disconnected, the soft handoff system is used as the handoff system and accordingly, loss of the call can be prevented.

DETAILED DESCRIPTION OF PREFERRED EMBODIMENTS

Figure 1:
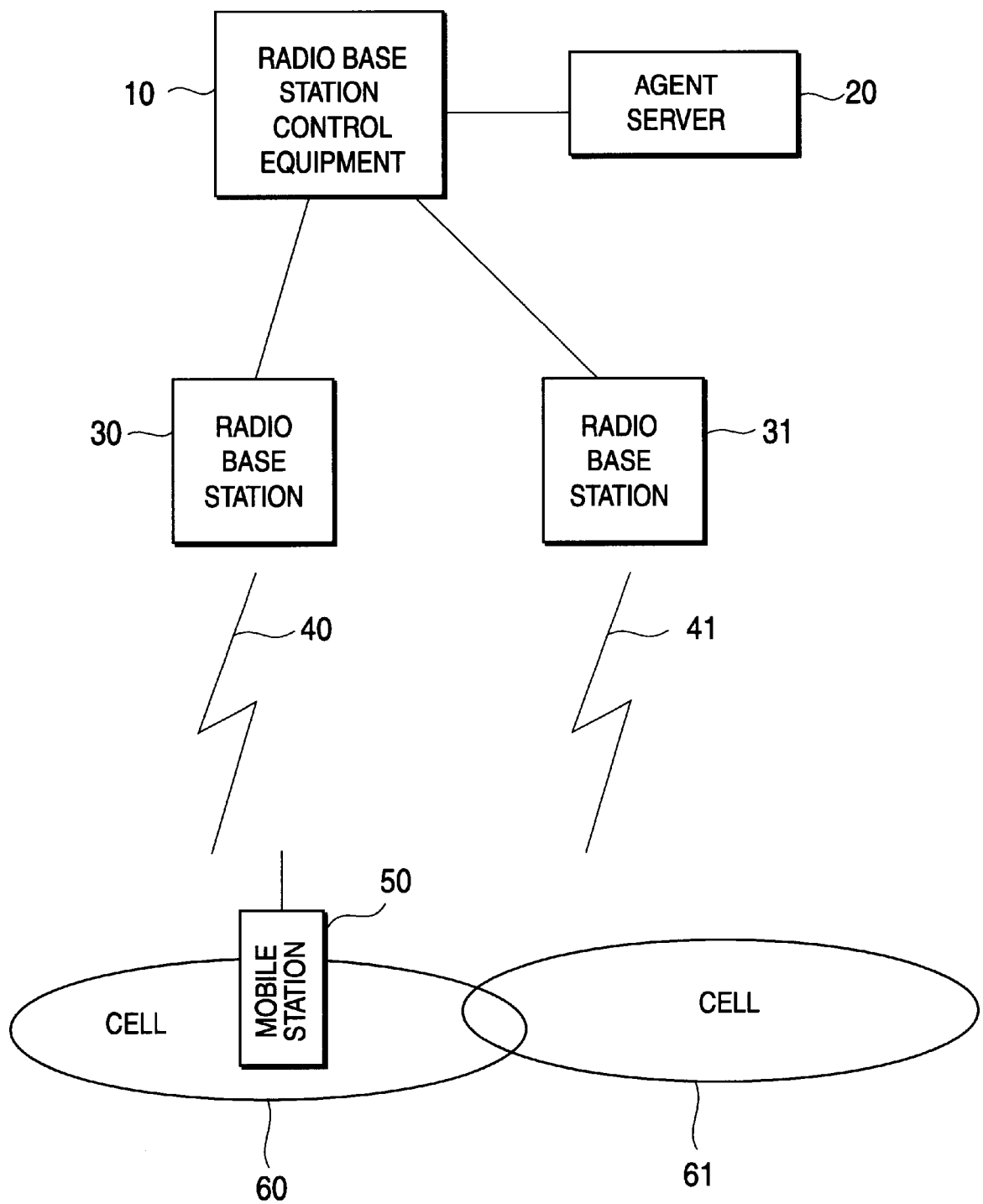
FIG. 1 is a block diagram showing a constitution of a CDMA radio data system to which a selection method of a handoff system according to an embodiment of the present invention is applied.

A detailed explanation will be given of embodiments according to the present invention in reference to the drawings as follows.

First, an explanation will be given of a CDMA radio data communication system to which a selection method of a handoff system according to an embodiment of the present invention is applied in reference to FIG. 1.

The illustrated CDMA radio data communication system is provided with a radio base station control equipment 10 connected to mobile switching centers (not illustrated), an agent server 20, a first and a second radio base stations 30 and 31 and a mobile station 50.

The radio base station control equipment 10 is connected to the first and the second radio base stations 30 and 31 and the agent server 20. The first and the second radio base stations 30 and 31 respectively cover a first and a second cells 60 and 61 by a first and a second radio channels 40 and 41. According to the illustrated example, the mobile station 50 is locating in a cell of the first base station area 60.

The radio base station control equipment 10 controls the first and the second radio base stations 30 and 31 as well as the first and second radio channels 40 and 41. Further, the radio base station control equipment 10 carries out call control of the mobile station 50.

The agent server 20 incorporates agents for various applications and constructs a relationship of server and client between an agent used in communication among a total of the incorporated agents and an agent provided in the mobile station 50. That is, the side of the base station operates as a server and the side of mobile station operates as a client.

In this case, an agent incorporated to the agent server 20 is referred to as a "server side agent". Further, an agent incorporated by the mobile station 50 is referred to as a "client side agent".

Caution is required here to the fact that the client side agent incorporated by the mobile station and the server side agent incorporated by the agent server 20 may be the same as each other or although the mobile station 50 may be provided therewith, the agent server 20 may not be provided with, conversely, although the agent server 20 may be provided therewith, the mobile station 50 may not be provided therewith. However, generally, whereas the agent server 20 incorporates the server side agents of all (almost all) kinds, the mobile station 50 incorporates the client side agents of a smaller number of kinds. Further, although there is a case in which the mobile station 50 does not incorporate a single client side agent, the present invention is not applied to this case. That is, the present invention is established on the premise that the mobile station 50 incorporates at least one client side agent. Further, caution is required to the fact that in carrying out data communication by using agents, agents which can be used in the data communication must be present both on the side of a base station (server) and the side of a mobile station (client).

Figure 4:
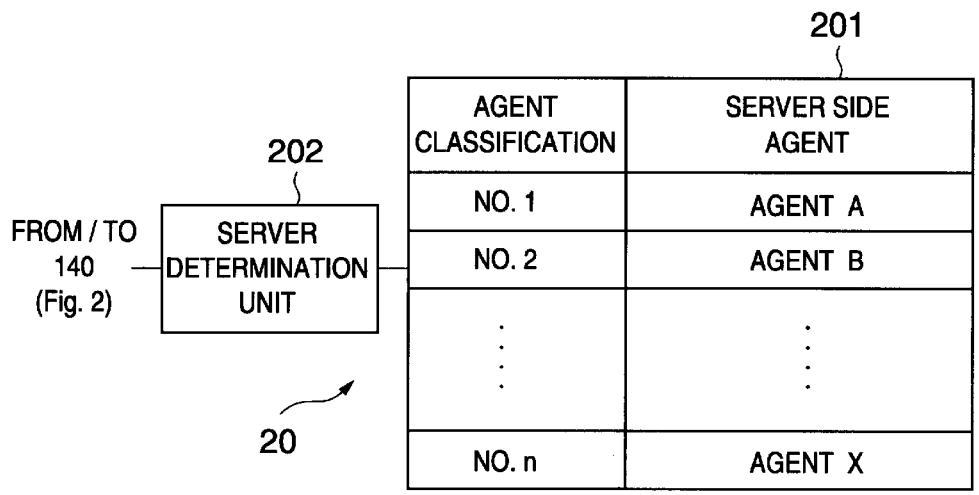
FIG. 4 is a block diagram showing a constitution of an agent server used in the CDMA radio data system shown by FIG. 1.

FIG. 4 shows a constitution of the agent server 20. As shown by FIG. 4, the agent server 20 is provided with a server side agent storing unit 201 incorporating server side agents for respective agent kinds and a server determining unit 202 for determining whether a server side agent in correspondence with a corresponding application is present in the server side agent storing unit 201.

Referring back to FIG. 1, the first and the second radio base stations 30 and 31 respectively carry out communication with mobile stations in the first and the second base station areas 60 and 61 by the first and the second radio channels 40 and 41.

The mobile station 50 comprises input/output devices of a mobile terminal, an adapter, a personal computer and so on and carries out processing of determination of an agent, control of a handoff system and call connection, as mentioned later.

As described later in details, in originating a call of data communication or in carrying out data transmission, the mobile station 50 detects presence or absence of an agent function previously in the station per se and informs to the radio base station control equipment 10 presence or absence of an agent and a kind of an agent for application used (identifier) along with a call connection request or an agent request.

That is, in requesting call connection, the mobile station 50 transmits a call connection request signal and in the call connection request signal, there is information of presence or absence of an agent and a kind of an agent for application to be used used. In the following, a call connection request signal including information indicating presence of an agent is described as "a call connection request (with agent)" and a call connection request signal including information indicating absence of an agent is described as "a call connection request (without agent)". Further, in data transmission, the mobile station 50 transmits an agent request signal and in the agent request signal, there is information showing a kind of an agent for application to be used used.

The radio base station control equipment 10 detects whether there is a server side agent for corresponding application in the agent server 20 based on a kind of an agent in the call connection request signal (or agent request signal), and informs a result of detection to the mobile station 50. Based on the result of detection, the mobile station 50 informs the radio base station control equipment 10 that the mobile station 50 carries out communication by a hard handoff system when an agent can be used, and informs the radio base station control equipment 10 that the mobile station 50 carries out communication by a soft handoff system when an agent cannot be used.

In this way, according to the present invention, in the case of data communication in which communication can be continued by an agent even when a call is interrupted, the hard handoff system is used as the handoff system and accordingly, the radio channel can be utilized effectively.

Further, in the case in which communication is difficult to continue as in the case in which communication must be carried out again from the start when the call is interrupted, the soft handoff system is used as the handoff system and accordingly, loss of call can be prevented.

Next, an explanation will be given of a handoff control and an agent control block of the radio base station control equipment 10.

Figure 2:
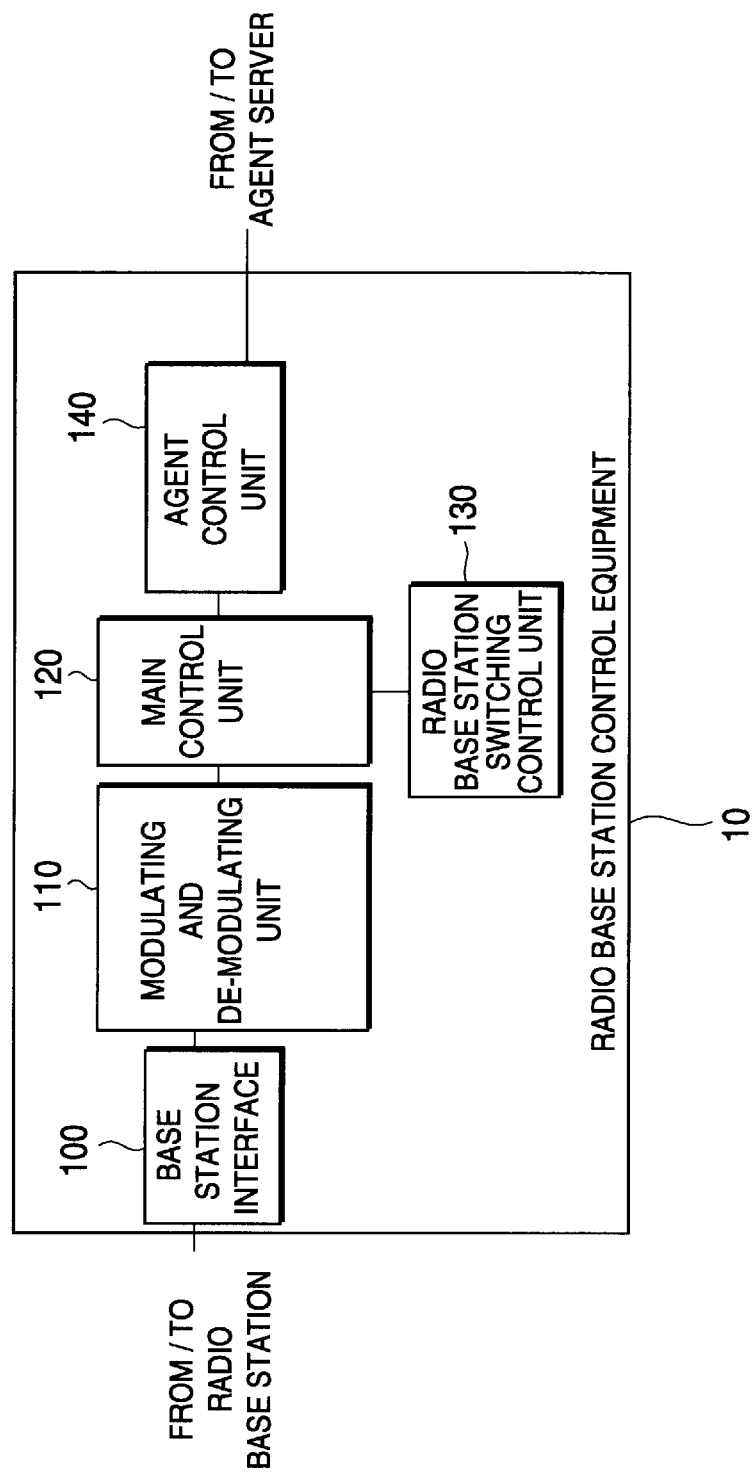
FIG. 2 is a block diagram showing a constitution of a radio base station control equipment used in the CDMA radio data system shown by FIG. 1.

FIG. 2 is a block diagram showing an example of the constitution of the radio base station control equipment 10 shown by FIG. 1. The radio base station control equipment 10 is installed with a base station interface 100, a multiplexing and de-multiplexing unit 110, a main control unit 120, a radio base station switching control unit 130 and an agent control unit 140.

Figure 10:
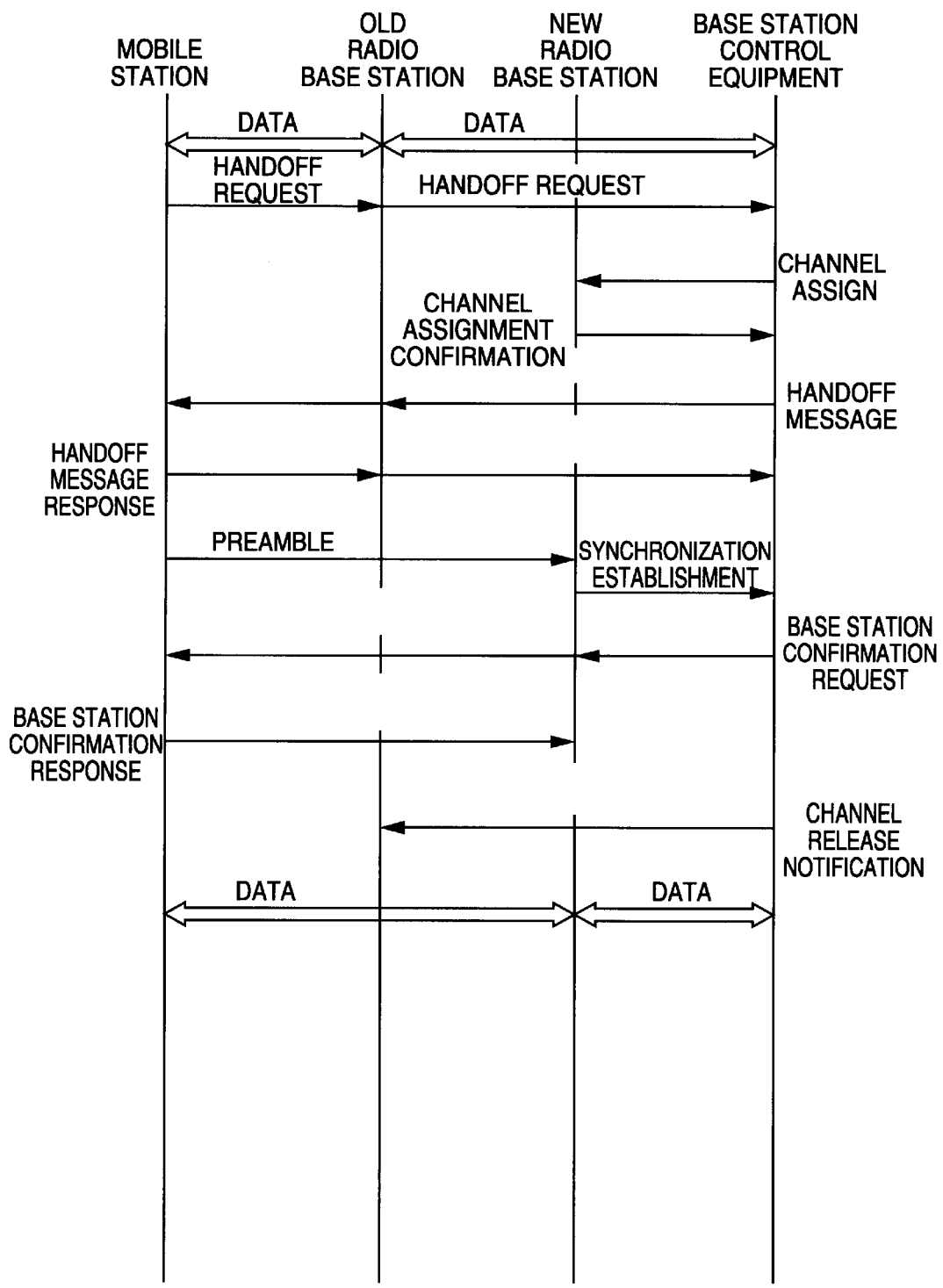
FIG. 10 is a sequence diagram for explaining operation of hard handoff in the CDMA radio data system shown by FIG. 1.
Figure 11:
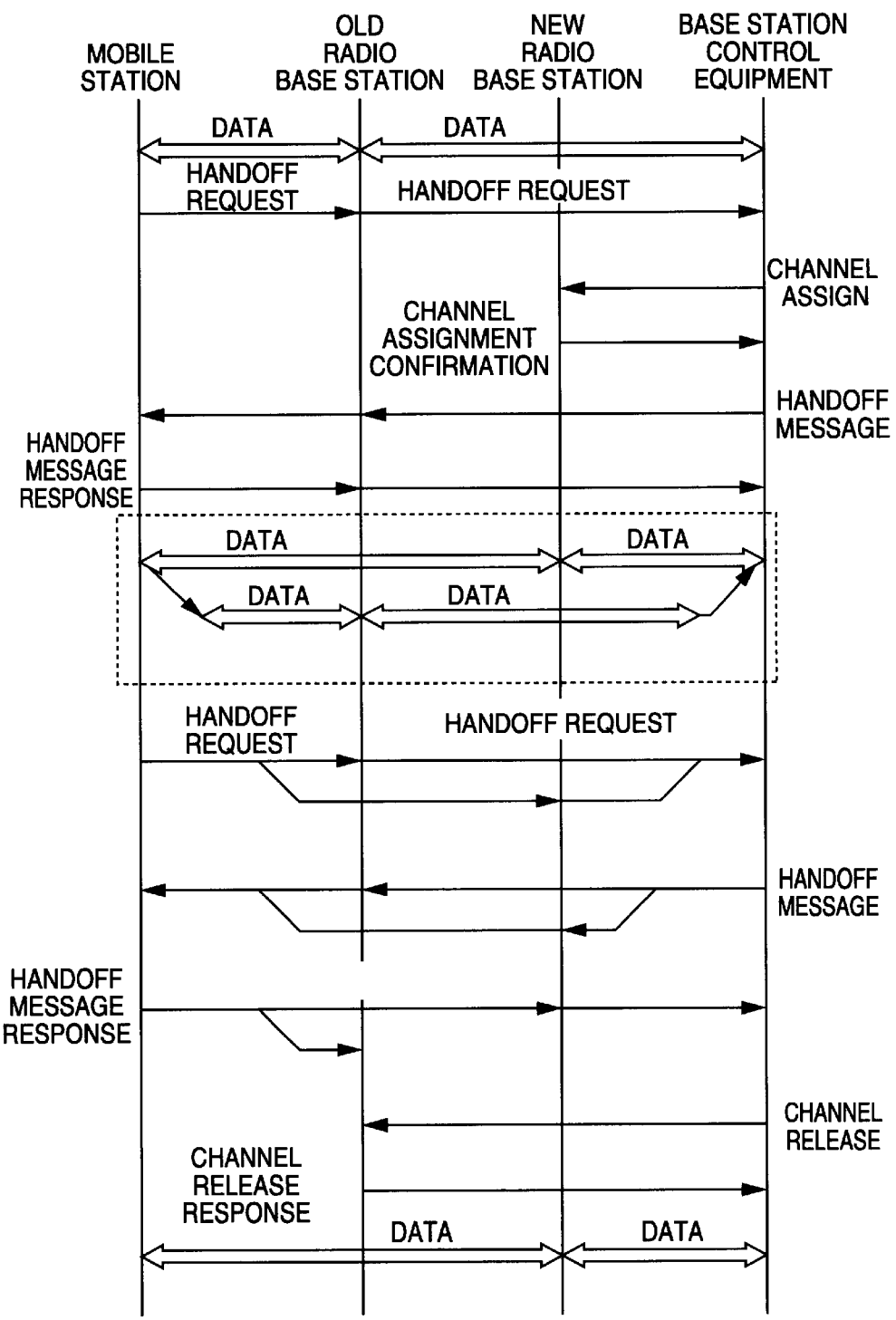
FIG. 11 is a sequence diagram for explaining operation of soft handoff in the CDMA radio data system shown by FIG. 1.
Figure 12:
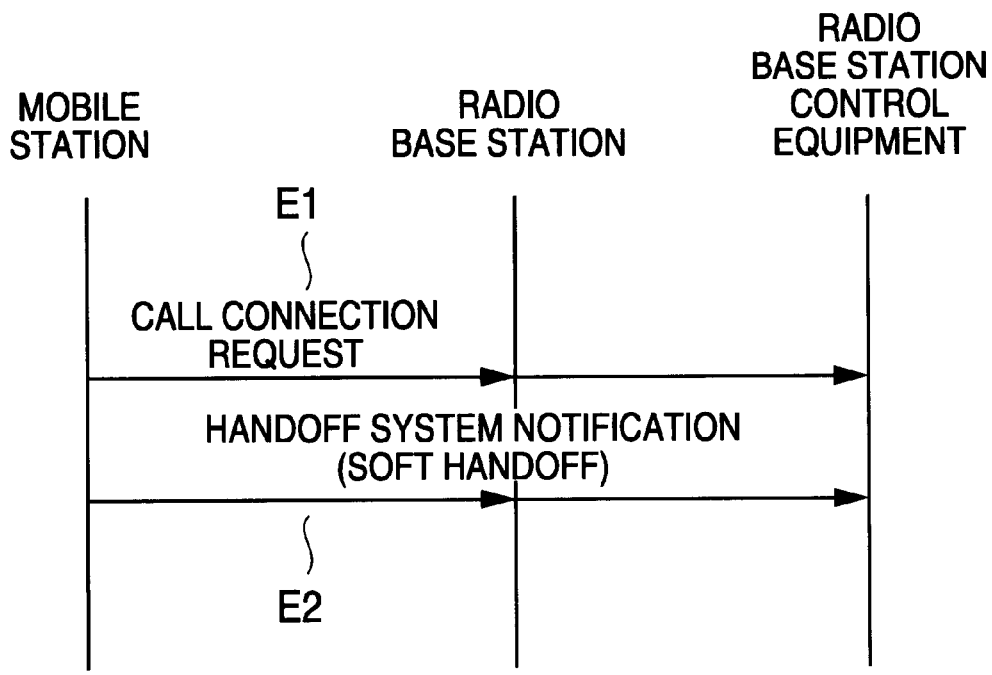
FIG. 12 is a sequence diagram for explaining operation of data communication (selection method of a handoff system) according to a conventional CDMA radio data system.

The base station interface 100 is connected to the radio base stations 30 and 31 (refer to FIG. 1). The multiplexing and de-multiplexing unit 110 is connected to the base station interface 100 and multiplexes input signals from the radio base stations and de-multiplexes output signals to the respective radio base stations. The control unit 120 is connected to the multiplexing and de-multiplexing unit 110 and processes control signals necessary for call processing and so on. The radio base station switching control unit 130 is connected to the main control unit 120 and carries out handoff control of hard handoff (as shown in FIG. 10) and soft handoff (as shown in FIG. 11). The agent control unit 140 is connected to the main control unit 120 and the agent server 20 (refer to FIG. 1) and administers and controls agents stored in the agent server 20.

An explanation will be given of operation of the radio base station control equipment 10 shown by FIG. 2 as follows.

The main control unit 120 receives a call connection request indicating presence or absence of an agent function from the mobile station 50 via the base station interface 100 and the multiplexing and de-multiplexing unit 110. When the received call connection request indicates presence of an agent function, the main control unit 120 informs a kind of an agent for application included in the call connection request to the agent control unit 140. The agent control unit 140 makes a request to the agent server 20 in respect of whether the agent server 20 is provided with a corresponding server side agent for application. The radio base station switching control unit 130 stores a handoff system informed from the mobile base station 50 and operates the handoff system designated with regard to the corresponding call.

Figure 3:
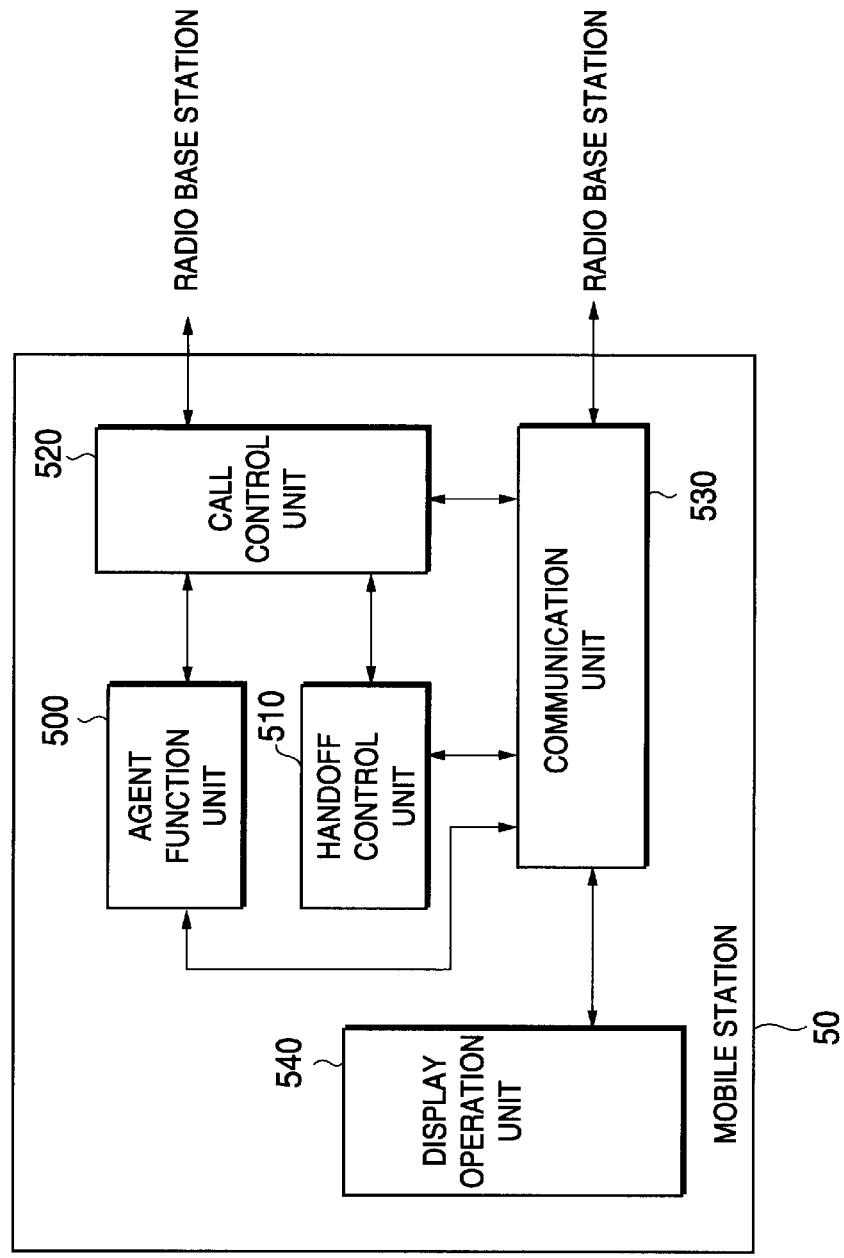
FIG. 3 is a block diagram showing a constitution of a mobile station used in the CDMA radio data system shown by FIG. 1.

FIG. 3 is a block diagram showing the constitution of the mobile station 50 shown by FIG. 1. The mobile station 50 is installed with an agent function unit 500, a handoff control unit 510, a call control unit 520, a communication unit 530 and a display operation unit 540.

The agent function unit 500 is connected to the call control unit 520 and the communication unit 530. The handoff control unit 510 is connected to the call control unit 520 and the communication unit 530. The call control unit 520 is connected to the agent function unit 500, the handoff control unit 510 and the communication unit 530. The communication unit 530 is connected to the agent function unit 500, the handoff control unit 510, the call control unit 520 and the display operation unit 540. The display operation unit 540 is connected to the communication unit 530.

The agent function unit 500 incorporates client side agents for various applications.

Figure 5:
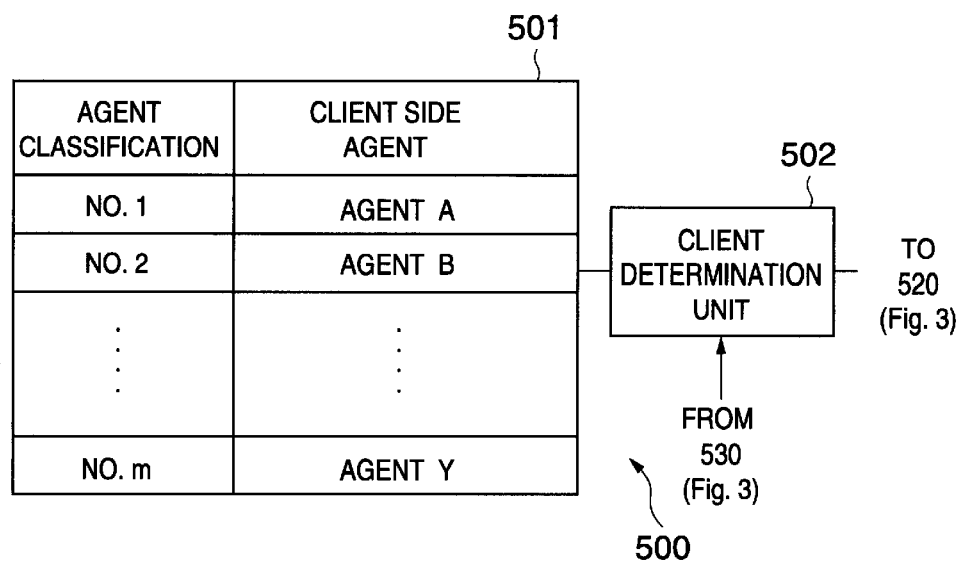
FIG. 5 is a block diagram showing a constitution of an agent function unit used in the mobile station shown by FIG. 3.

FIG. 5 shows the constitution of the agent function unit 500. As shown by FIG. 5, the agent function unit 500 is provided with a client side agent storing unit 501 for incorporating client side agents for respective agent kinds and a client determining unit 502 for determining whether the client side agent storing unit 501 is provided with a corresponding client side agent for application.

Referring back to FIG. 3, the handoff control unit 510 determines a handoff system and informs it to the radio base station. The call control unit 520 carries out a call connection processing and the communication unit 530 carries out processing of communication data. The display operation unit 540 is for inputting or displaying data and is generally constituted by an input device of a keyboard, a mouse or the like or a display device of display or the like.

In the following, an explanation will be given of operation of the mobile station 50 illustrated in FIG. 3.

A connection request of data communication is informed to the communication unit 530 by the display operation unit 540. The communication unit 530 informs the connection destination to the call control unit 520 and informs an application to be used to the agent function unit 500. The agent function unit 500 determines whether there is a client side agent for corresponding application, and informs a result of determination to the call control unit 520. The call control unit 520 makes a call connection request to the radio base station control equipment 10. Further, the call control unit 520 informs content of response of agent to the agent function unit 500 and the handoff control unit 510. The handoff control unit 510 informs a handoff system to the radio base station control equipment 10 via the call control unit 520 based on the content of response of agent. That is, when the content of response of agent indicates a capability of using an agent, the handoff control unit 510 informs a handoff system indicating to carry out a hard handoff control to the radio base station control equipment 10 via the call control unit 520. In the meantime, when the content of response of agent indicates an incapability of using an agent, the handoff control unit 510 informs a handoff system indicating to carry out a soft handoff control.

Next, an explanation will be given of operation of a selection method of a handoff system according to the first embodiment of the CDMA radio data system illustrated in FIG. 1 also in reference to FIG. 6 in addition to FIG. 1 through FIG. 5.

Figure 6:
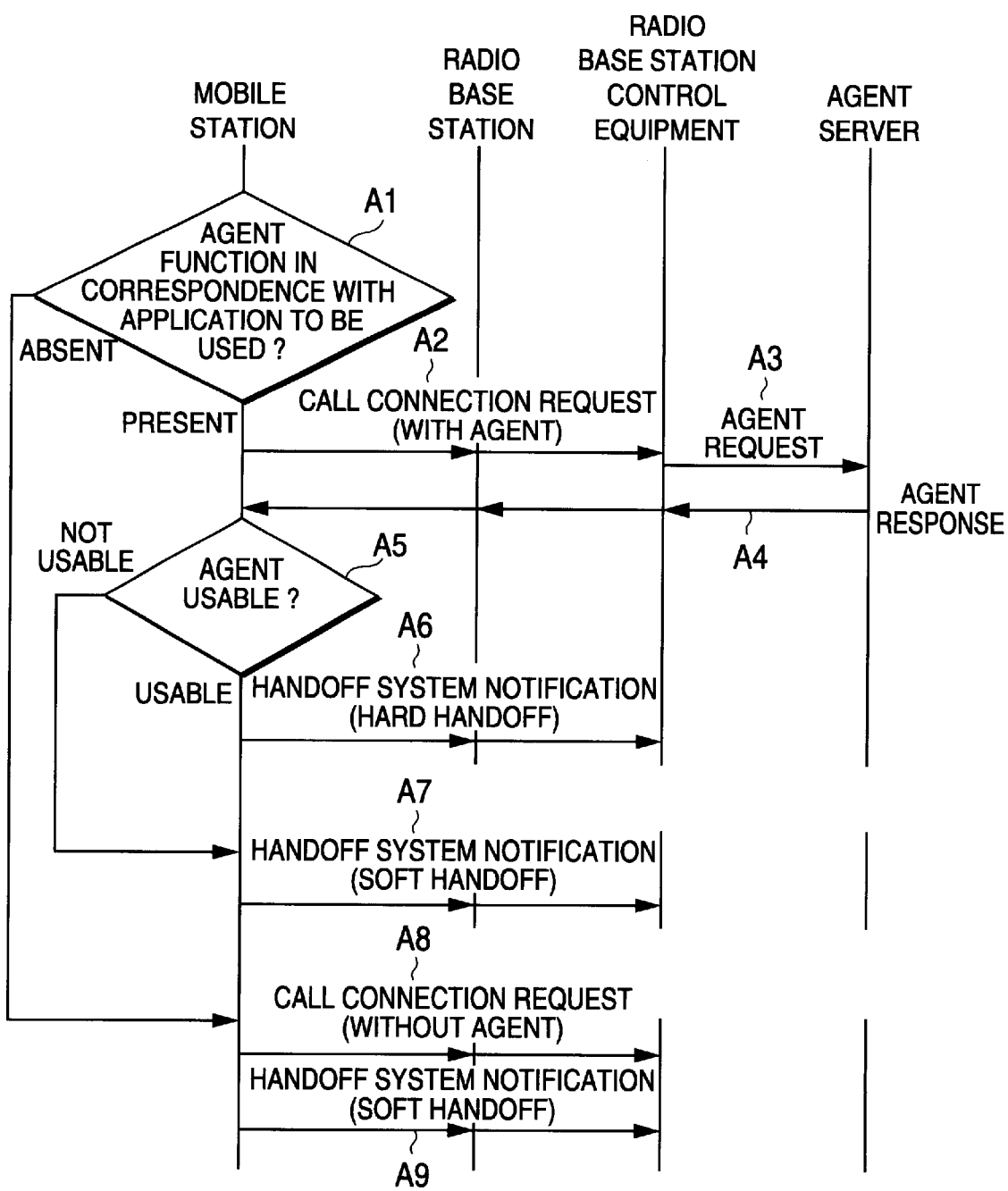
FIG. 6 is a sequence diagram for explaining a selection method of a handoff system according to a first embodiment of the present invention.

The mobile station 50 determines whether there is an agent function for application to be used in carrying out data communication in the station per se (FIG. 6: step A1). In details, the mobile station 50 (FIG. 3) informs to carry out call connection from the display operation unit 540 to the communication unit 503. In response to the information, the communication unit 503 inquires to the agent function unit 500 whether there is present a client side agent in correspondence with a kind communication application used in the communication unit 503. In response to the inquiry, the client determination unit 502 in the agent function unit 500 determines whether there is present a client side agent in correspondence with the communication application in the client side agent storing unit 501. When the corresponding client side agent is present in the client side agent storing unit 501, the client determining unit 502 transmits presence of the corresponding agent and its kind to the call control unit 502.

When the corresponding agent function is present (presence of step A1 in FIG. 6), the mobile station 50 carries out a call connection request (with agent) to the radio base station control equipment 10 (FIG. 6: step A2). That is, the call control unit 502 transmits the call connection request signal including presence of the corresponding client side agent and an agent kind indicating the kind of the client side agent in correspondence with application used in communication to the radio base station control equipment 10 via the radio base station 30.

The radio base station control equipment 10 reads the agent kind for application included in the call connection request (with agent) and makes a request to the agent server 20 in respect of whether there is a server side agent for application (FIG. 6: step A3). In details, the call connection request signal is transmitted to the main control unit 120 (FIG. 2) via the base station interface 100 and the multiplexing and de-multiplexing unit 110. The main control unit 120 extracts the agent kind contained in the call connection request signal and transmits it to the agent control unit 140. The agent control unit 140 inquires to the agent server 20 whether a server side agent represented by the agent kind is present in the agent server 20.

The agent server 20 transmits a response signal to the mobile station 50 (FIG. 6: step A4). In details, the determination unit 202 (FIG. 4) of the agent server 20 returns a response signal indicating whether a corresponding server side agent for application is present in the server side agent storing unit 201 to the agent control unit 140 (FIG. 2) with regard to the above-described inquiry. The agent control unit 140 transmits the response signal to the mobile station 50 via the main control unit 120, the multiplexing and de-multiplexing unit 110, the base station interface 100 and the radio base station 30.

The mobile station 50 detects whether an agent can be used in response to the response signal (FIG. 6: step A5). That is, the handoff control unit 510 determines whether an agent can be used in communication based on the response signal received via the call control unit 520. In this case, when the response signal indicates that there is a server side agent for corresponding application in the agent server 20, the handoff control unit 510 determines that an agent can be used in communication. Conversely, when the response signal indicates that there is no server side agent for corresponding application in the unit server 20, the handoff control unit 510 determines that an agent cannot be used in communication.

When an agent can be used, the mobile station 50 informs a handoff system (hard handoff) to the radio base station control equipment 10 via the radio base station 30 (FIG. 6: step A6). That is, the handoff control unit 510 informs that a hard handoff system is used as the handoff system to the radio base station control equipment 10 via the call control unit 520 and the radio base station 30.

When an agent cannot be used, the mobile station 50 informs a handoff system (soft handoff) to the radio base station control equipment 10 via the radio base station 30 (FIG. 6: step A7). That is, the handoff control unit 510 informs that a soft handoff system is used as the handoff system to the radio base station control equipment 10 via the call control unit 520 and the radio base station 30.

In the meantime, assume that the agent function unit 500 of the mobile station 50 does not hold a client side agent in correspondence with application used. In this case, the mobile station 50 makes a call connection request (without agent) to the radio base station control equipment 10 as absence of agent function (FIG. 6: step A8), and informs that a soft handoff system is used as the handoff system (FIG. 6: step A9).

According to the radio base station control equipment 10 which has received the handoff system (hard handoff), the radio base station switching control unit 130 stores the handoff system (hard handoff) and the hard handoff system (FIG. 10) is operated. In the meantime, according to the radio base station control equipment 10 which has received the handoff system (soft handoff), the radio base station switching control unit 130 stores the handoff system (soft handoff) and the soft handoff system (FIG. 11) is operated.

Next, an explanation will be given of a selection method of a handoff system according to a second embodiment in reference also to FIG. 7 in addition to FIG. 1 through FIG. 5.

Although the second embodiment of the present invention is the same as the first embodiment of the present invention described above in respect of basic portions of the radio base station control equipment 10 shown by FIG. 2, it defers from the above-described first embodiment of the present invention in that notification of a handoff system is carried out from the radio base station control equipment 10 to the mobile station 50. In the following, a brief explanation will be given of portions similar to those in the first embodiment and a detailed explanation will be given of portions different therefrom.

Figure 7:
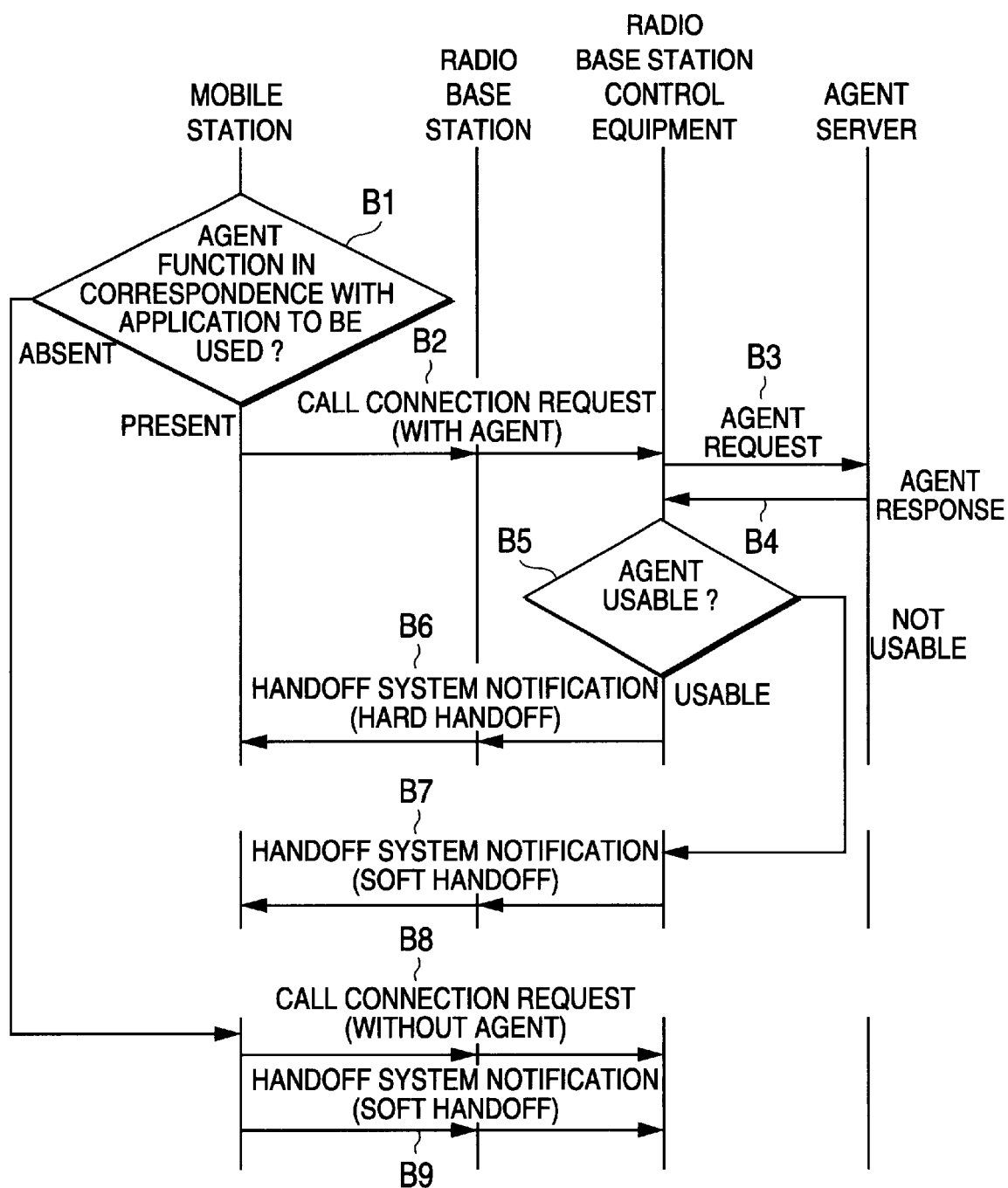
FIG. 7 is a sequence diagram for explaining a selection method of a handoff system according to a second embodiment of the present invention.

In carrying out data communication, the mobile station 50 determines whether the station per se is provided with an agent function for application which is going to be used (FIG. 7: step B1). When it is determined that there is a corresponding agent function, the mobile station 50 makes a call connection request (with agent) to the radio base station control equipment 10 along with information indicating presence of the agent function and a kind of the agent (FIG. 7: step B2).

The radio base station control equipment 10 reads a kind of the agent for application included in the call connection request (with agent) and makes a request in respect of whether the agent server 20 is provided with a corresponding server side agent for application (FIG. 7: step B3).

The agent server 20 transmits a response signal to the radio base station control equipment 10 (FIG. 7: step B4).

According to the radio base station control equipment 10, the agent control unit 140 receives a response of agent from the agent server 20 (FIG. 7: step B4) and the radio base station control equipment 10 determines whether an agent can be used (FIG. 7: step B5). When an agent can be used, the radio base station control equipment 10 informs a handoff system (hard handoff) to the mobile station 50 (FIG. 7: step B6). That is, the agent control unit 140 informs that a hard handoff system is used as the handoff system to the mobile station 50 via the main control unit 120, the multiplexing and de-multiplexing unit 110, the base station interface 100 and the radio base station 30. In this case, the agent control unit 140 informs the handoff system (hard handoff) also to the radio base station switching control unit 130 via the main control unit 120.

In the meantime, when an agent cannot be used, the radio base station control equipment 10 informs a handoff system (soft handoff). That is, the agent control unit 140 informs that a soft handoff system is used as the handoff system to the mobile station 50 via the main control unit 120, the multiplexing and de-multiplexing unit 110, the base station interface 100 and the radio base station 30. In this case, the agent control unit 140 informs the handoff system (soft handoff) also to the radio base station switching control unit 130 via the main control unit 120.

The handoff control unit 510 of the mobile station 50 which has received notification of the handoff system, carries out the handoff control by the handoff system designated thereto (FIG. 10 or FIG. 11).

When the mobile station 50 does not hold an agent function in correspondence with application used (absence of step B1 of FIG. 7), the mobile station 50 makes a call connection request (without agent) to the radio base station control equipment 10 as absence of the agent function (FIG. 7: step B8) and informs a handoff system (soft handoff) (FIG. 7: step B9).

Although according to the above-described embodiments, an explanation has been given of operation when the mobile station 50 makes "a call", the present invention is similarly applicable to a case in which the mobile station 50 carries out "data transmission" as explained below.

Next, an explanation will be given of operation of a selection method of a handoff system according to a third embodiment of the present invention in reference also to FIG. 8 in addition to FIG. 1 through FIG. 5.

Figure 8:
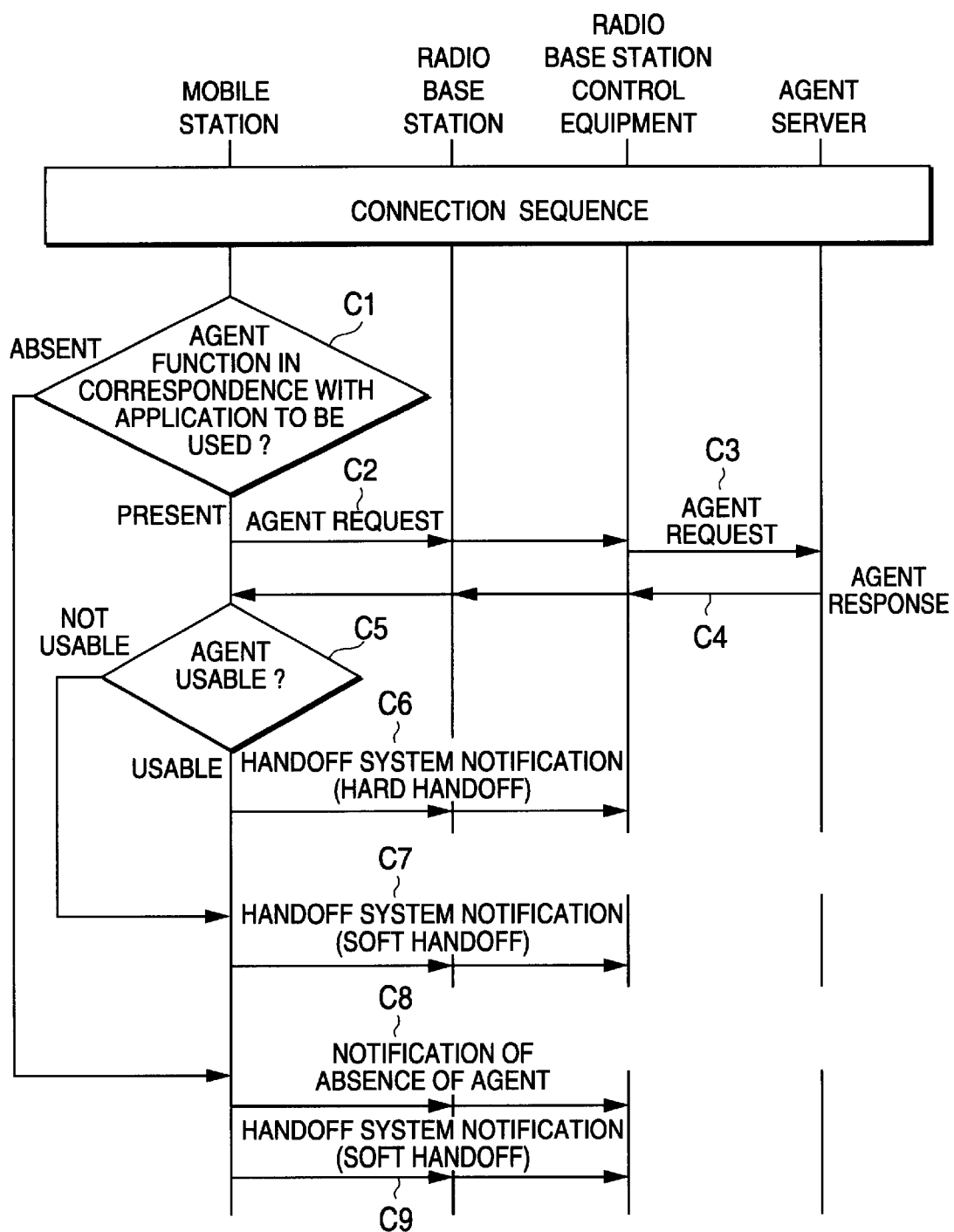
FIG. 8 is a sequence diagram for explaining a selection method of a handoff system according to a third embodiment of the present invention.

After carrying out the connection sequence (call origination and call termination at mobile station), the mobile station 50 determines whether the station per se is provided with an agent function for application used in carrying out data transmission (FIG. 8: step C1). In details, the display operation unit 504 informs that the communication unit 503 that data transmission is carried out. In response to the notification, the communication unit 503 inquires the agent function unit 500 in respect of whether there is a client side agent in correspondence with a kind of communication application used in the communication unit 503. In response to the inquiry, the client determination unit 502 at inside of the agent function unit 500 determines whether there is present a client side agent in correspondence with the communication application in the client side agent storing unit 501. When there is present the client side agent in the client side storing unit 501, the client determination unit 502 transmits presence of the corresponding agent and its kind to the call control unit 502.

When there is a corresponding agent function (presence of step C1 of FIG. 8), the mobile station 50 makes a request of an agent to the radio base station control equipment 10 (FIG. 8: step C2). That is, the call control unit 502 transmits an agent request signal including an agent kind indicating a kind of a client side agent in correspondence with application used in communication to the radio base station control equipment 10 via the radio base station 30.

The radio base station control equipment 10 reads the agent kind for application included in the agent request and makes a request to the agent server 20 in respect of whether the agent server 20 is provided with a server side agent for corresponding application (FIG. 8: step C3). In details, the agent request signal mentioned above is transmitted to the main control unit 120 via the base station interface 100 and the multiplexing and de-multiplexing unit 110. The main control unit 120 extracts the agent kind contained in the agent request signal and transmits it to the agent control unit 140. The agent control unit 140 inquires to the agent server 20 in respect of whether a server side agent represented by the agent kind is present in the agent server 20.

The agent server 20 transmits a response signal to the mobile station 50 (FIG. 8: step C4). In details, in respect of the above-described inquiry, the server determination unit 202 of the agent server 20 returns to the agent control unit 140 the response signal indicting whether the server side agent storing unit 201 is provided with a corresponding server side agent for application. The agent control unit 140 transmits the response signal to the mobile station 50 via the main control unit 120, the multiplexing and de-multiplexing unit 110, the base station interface 100 and the radio base station 30.

The mobile station 50 detects whether an agent can be used in response to the response signal (FIG. 8: step C5). That is, the handoff control unit 510 determines whether an agent can be used in communication based on the response signal received via the call control unit 520. In this case, when the response signal indicates that the agent server 20 is provided with a corresponding server side agent for application, the handoff control unit 510 determines that an agent can be used. Conversely, when the response signal indicates that the agent server 20 is not provided with a server side agent for application, the handoff control unit 510 determines that an agent cannot be used in communication.

When an agent can be used, the mobile station 50 informs a handoff system (hard handoff) to the radio base station control equipment 10 via the radio base station 30 (FIG. 8: step C6). That is, the handoff control unit 510 informs that a hard handoff system is used as the handoff system to the radio base station control equipment 10 via the call control unit 520 and the radio base station 30.

When an agent cannot be used, the mobile station 50 informs a handoff system (soft handoff) to the radio base station control equipment 10 via the radio base station 30 (FIG. 8: step C7). That is, the handoff control unit 510 informs that a soft handoff system is used as the handoff system to the radio base station control equipment 10 via the call control unit 520 and the radio base station 30.

In the meantime, assume that the mobile station 50 does not hold a client side agent in correspondent with application used by the agent function unit 500. In this case, the mobile station 50 informs absence of an agent to the radio base station control equipment 10 as absence of an agent function (FIG. 8: step C8) and informs that a soft handoff system is used as the handoff system (FIG. 8: step C9).

According to the radio base station control equipment 10 which has received the handoff system (hard handoff), the radio base station switching control unit 130 stores the handoff system (hard handoff) and the hard handoff system (FIG. 10) is operated. In the meantime, according to the radio base station control equipment 10 which has received the handoff system (soft handoff), the radio base station switching control unit 130 stores the handoff system (soft handoff) and the soft handoff system (FIG. 11) is operated.

Next, an explanation will be given of a selection method of a handoff system according to a fourth embodiment of the present invention in reference also to FIG. 9 in addition to FIG. 1 through FIG. 5.

Although the fourth embodiment of the present invention is the same as the third embodiment of the present invention described above in respect of basic portions of the radio base station control equipment 10 shown by FIG. 2, it differs from the third embodiment of the present invention described above in that notification of a handoff system is carried out from the radio base station control equipment 10 to the mobile station 50. In the following, a brief explanation will be given of portions similar to those of the third embodiment and a detailed explanation will be given of portions different therefrom.

Figure 9:
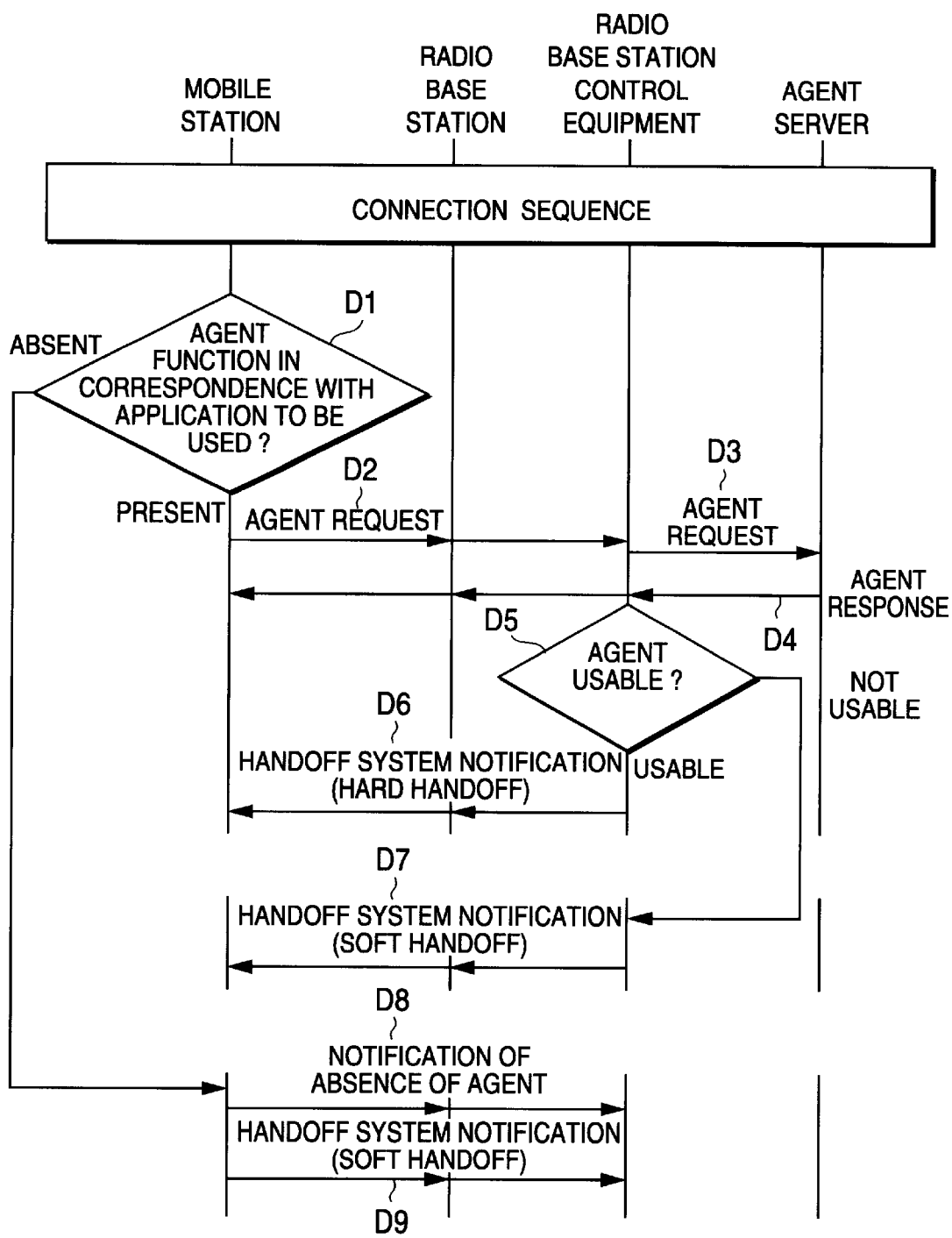
FIG. 9 is a sequence diagram for explaining a selection method of a handoff system according to a fourth embodiment of the present invention.

After carrying out a connection sequence (call origination and call termination at the mobile station), the mobile station 50 determines whether the station per se is provided with an agent function for application which is going to be used in carrying out data transmission (FIG. 9: step D1). When it is determined that there is a corresponding agent function, the mobile station 50 makes an agent request to the radio base station control equipment 10 along with information indicting the agent kind (FIG. 9: step D2).

The radio base station control equipment 10 reads the agent kind for application included in the agent request and makes a request to the agent server 20 in respect of whether the agent server 20 is provided with a server side agent for corresponding application (FIG. 9: step D3).

The agent server 20 transmits a response signal to the radio base station control equipment 10 (FIG. 9: step D4).

According to the radio base station control equipment 10, the agent control unit 140 receives a response of agent from the agent server 20 (FIG. 9: step D4) and the radio base station control equipment 10 determines whether an agent can be used (FIG. 9: step D5). When an agent can be used, the radio base station control equipment 10 informs a handoff system (hard handoff) to the mobile station 50 (FIG. 9: step D6). That is, the agent control unit 140 informs that a hard handoff system is used as the handoff system to the mobile station 50 via the main control unit 120, the multiplexing and de-multiplexing unit 110, the base station interface 100 and the radio base station 30. In this case, the agent control unit 140 informs the handoff system (hard handoff) also to the radio base station switching control unit 130 via the main control unit 120.

In the meantime, when an agent cannot be used, the radio base station control equipment 10 informs a handoff system (soft handoff) (FIG. 9: step D7). That is, the agent control unit 140 informs that a soft handoff system is used as the handoff system to the mobile station 50 via the main control unit 120, the multiplexing and de-multiplexing unit 110, the base station interface 100 and the radio base station 30. In this case, the agent control unit 140 informs the handoff system (soft handoff) also to the radio base station switching control unit 130 via the main control unit 120.

The handoff control unit 510 of the mobile station 50 which has received notification of the handoff systems, carries out the handoff control in accordance with the handoff systems designated thereto (FIG. 10 or FIG. 11).

When the mobile station 50 does not hold an agent function in correspondence with application used (absence of step D1 of FIG. 9), the mobile station 50 informs absence of an agent to the radio base station control equipment 10 as absence of an agent function (FIG. 9: step D8) and informs a handoff system (soft handoff) (FIG. 9: step D9).

Incidentally, the present invention is not limited to the above-described embodiments but can naturally be modified variously within a range not deviated from the gist of the present invention. For example, according to the above-described embodiments, an explanation has been given only in respect of a case in which the mobile station 50 makes "a call" and a case in which the mobile station 50 carries out "data transmission", the present invention is applicable also to a case in which the mobile station 50 receives "a call" or a case in which the mobile station 50 carries out "data reception".

As has been explained, according to the present invention, there are achieved effects described below.

A first effect is that radio channels can be effectively utilized. The reason is that in the case of data communication in which communication can be continued by agents even when a call is disconnected, a hard handoff system is used as the handoff system.

A second effect is that loss of a call can be prevented. The reason is that in the case in which communication is difficult to continue as in a case in which communication must be carried out again from the start when a call is disconnected, a soft handoff system is used as the handoff system.

What is claimed is:

1. A selection method of a handoff system in a CDMA radio data communication system characterized in a selection method of either of a hard handoff system and a soft handoff system as the handoff system, the method comprising;

transmitting a call connection request signal, by a mobile station, including information of presence of a client side agent and a kind of the client side agent in correspondence with an application to be used in the communication, to a radio base station control equipment;

searching presence of a server side agent corresponding to the client side agent in an agent server which is connected to the radio base station control equipment;

selecting the hard handoff system when the server side agent corresponding to the client side agent is provided in the agent server; and selecting the soft handoff system when the server side agent corresponding to the client side agent is not provided in the agent server.

2. A selection method of a handoff system in a CDMA radio data communication system characterized in a selection method of either of a hard handoff system and a soft handoff system as the handoff system, the method comprising:

transmitting a call connection request signal, by a mobile station, including information of presence of a client side agent and a kind if the client side agent in correspondence with an application to be used in the communication, to a radio base station control equipment;

searching presence of a server side agent corresponding to the client side agent in an agent server which is connected to the radio base station control equipment;

returning the searching result of the server side agent; and determining the handoff system based on an availability of the server side agent in the agent server obtained by the searching result.

3. The selection method of a handoff system in a CDMA radio data communication system according to claim 2, wherein, the hard handoff system is determined for selection of the handoff system to be performed when the server side agent is available, and the soft handoff is determined for selection of the handoff system to be performed when the server side agent is not available.

4. The selection method of a handoff system in a CDMA radio data communication system according to claim 3, wherein, selection of the handoff system is determined by the mobile station, and informing the determining result to the radio base station control equipment.

5. The selection method of a bandoff system in a CDMA radio data communication system according to claim 3, wherein, selection of the handoff system is determined by the radio base station control equipment, and informing the determining result to the mobile station.

6. A selection method of a handoff system in a CDMA radio data communication system in which an agent server, connected to a radio base station control equipment and incorporating server side agents in correspondence with various applications, and a mobile station, incorporating a client side agent and carrying out a communication with radio base stations while moving in service areas by performing either of a hard handoff system and a soft handoff system, the method comprising;

confirming an availability of the client side agent for an application to be used in the mobile station;

transmitting a signal including information of the client side agent from the mobile station to the radio base station control equipment;

confirming an availability of the server side agent, which is corresponding to the client side agent informed by the mobile station, in the agent server;

informing the result of confirmation in the agent server to the mobile station; and determining the handoff system to be performed based on the availability of the server side agent in the agent server informed by the result of confirmation in the agent server.

* * * * *